US008811622B2

(12) United States Patent
Ang et al.

(10) Patent No.: US 8,811,622 B2

(45) Date of Patent: Aug. 19, 2014

(54) DUAL SETTING METHOD FOR A HEARING SYSTEM

(75) Inventors: Kerser Ang, Singapore (SG); Vivian Wong, Melbourne (AU)

(73) Assignee: Siemens Medical Instruments Pte. Ltd., Singapore (SG)

( * ) Notice: Subject to any disclaimer, the term of this patent is extended or adjusted under 35 U.S.C. 154(b) by 519 days.

(21) Appl. No.: 13/076,926

(22) Filed: Mar. 31, 2011

(65) Prior Publication Data

US 2011/0243339 A1 Oct. 6, 2011

(30) Foreign Application Priority Data

Mar. 31, 2010 (DE) ......................... 10 2010 013 603

(51) Int. Cl.

*H04R 5/00* (2006.01)
*H04R 25/00* (2006.01)
*H04R 29/00* (2006.01)
*H02B 1/00* (2006.01)

(52) U.S. Cl.

USPC ............. 381/23.1; 381/56; 381/123; 381/312

(58) Field of Classification Search

CPC .............................. H04R 25/552; H04R 25/43
USPC .............. 381/23.1, 123, 313, 312, 56, 58, 60, 381/315, 316, 317, 74, 310, 309

See application file for complete search history.

(56) References Cited

U.S. PATENT DOCUMENTS

| | | | | |
|---|---|---|---|---|
| 7,519,194 | B2 | 4/2009 | Niederdraenk et al. | |
| 2002/0191799 | A1* | 12/2002 | Nordqvist et al. | 381/60 |
| 2006/0018496 | A1 | 1/2006 | Niederdrank et al. | |
| 2006/0177072 | A1* | 8/2006 | Ward | 381/56 |
| 2007/0223753 | A1 | 9/2007 | Latzel | |

FOREIGN PATENT DOCUMENTS

| | | | |
|---|---|---|---|
| DE | 102004035256 | B3 | 9/2005 |
| DE | 102006014022 | A1 | 10/2007 |

OTHER PUBLICATIONS

Schmidt: "Left and Right Ears Not Created Equal as Newborns Process Sound", UCLA Newsroom, Jun. 29, 2009, University of Arizona Scientists Discover.

* cited by examiner

*Primary Examiner* — Vivian Chin
*Assistant Examiner* — Douglas Suthers
(74) *Attorney, Agent, or Firm* — Laurence A. Greenberg; Werner H. Stemer; Ralph E. Locher

(57) ABSTRACT

The perception of musical sound with a music component and a speech component is intended to be improved. To this end, a method is proposed for controlling a binaural hearing system with a left hearing-device for a left ear and a right hearing-device for a right ear, which method contains the below described steps. First of all, the hearing system determines a hearing situation with the music component and the speech component. Thereupon, one of the two hearing devices is switched into a music mode and, at the same time, the other one of the two hearing devices is switched into a speech mode. The hearing-aid wearer himself/herself can then decide which component of the sound he/she would rather listen to.

6 Claims, 2 Drawing Sheets

DUAL SETTING METHOD FOR A HEARING SYSTEM

CROSS-REFERENCE TO RELATED APPLICATION

This application claims the priority, under 35 U.S.C. §119, of German application DE 10 2010 013 603.4, filed Mar. 31, 2010; the prior application is herewith incorporated by reference in its entirety.

BACKGROUND OF THE INVENTION

Field of the Invention

The present invention relates to a method for controlling a binaural hearing system with a left hearing-device for a left ear and a right hearing-device for a right ear. A hearing situation with a music component and a speech component is determined in the method. A hearing device is understood to mean any sound-emitting appliance that can be worn in or on the ear, in particular a hearing aid, headphones, a headset and the like.

Hearing aids are portable hearing devices used to support the hard of hearing. In order to make concessions for the numerous individual requirements, different types of hearing aids are provided, e.g. behind-the-ear (BTE) hearing aids, hearing aids with an external receiver (receiver in the canal [RIC]) and in-the-ear (ITE) hearing aids, for example concha hearing aids or canal hearing aids (ITE, CIC) as well. The hearing aids listed in an exemplary fashion are worn on the concha or in the auditory canal. Furthermore, bone conduction hearing aids, implantable or vibrotactile hearing aids are also commercially available. In this case, the damaged sense of hearing is stimulated either mechanically or electrically.

In principle, the main components of hearing aids are an input transducer, an amplifier and an output transducer. In general, the input transducer is a sound receiver, e.g. a microphone, and/or an electromagnetic receiver, e.g. an induction coil. The output transducer is usually configured as an electroacoustic transducer, e.g. a miniaturized loudspeaker, or as an electromechanical transducer, e.g. a bone conduction receiver. The amplifier is usually integrated into a signal-processing unit. This basic configuration is illustrated in FIG. 1 using the example of a behind-the-ear hearing aid. One or more microphones 2 for recording the sound from the surroundings are installed in a hearing-aid housing 1 to be worn behind the ear. A signal-processing unit 3, likewise integrated into the hearing-aid housing 1, processes the microphone signals and amplifies them. The output signal of the signal-processing unit 3 is transferred to a loudspeaker or receiver 4, which emits an acoustic signal. If necessary, the sound is transferred to the eardrum of the equipment wearer using a sound tube, which is fixed in the auditory canal with an ear mold. A battery 5, likewise integrated into the hearing-aid housing 1, supplies the hearing aid and, in particular, the signal-processing unit 3 with energy.

In the case of binaural provision, the person with damaged hearing wears respectively one hearing aid on both the left ear and the right ear. The two hearing aids must be adapted to the respective hearing situation. By way of example, hearing situations include "speech in quiet surroundings", "speech with background noise", "music without speech", "music with speech" (e.g. song, opera) and the like.

Depending on the hearing situation, the hearing aids are generally switched into a specific hearing program. By way of example, there is a specific music program or a specific hearing-aid program for normal conversation. The program determines the parameters for the filtering, the gain, the compression, the frequency response, the directivity, etc. of a hearing aid. In the case of binaural provision, an effort is always made to switch the two hearing aids into the same hearing-aid mode in order to spare the hearing-aid wearer from distortions. However, the telephone situation provides an exception because in this case sound is merely directed at, or provided for, one ear from the telephone for physical reasons. The hearing aid facing away from the telephone may remain in the hearing-aid program or mode corresponding to the current hearing situation.

The hearing aids are usually switched into a music mode in a hearing situation in which instrumental music is played. The same holds true for a hearing situation in which a song is listened to. However, a song usually consists of an instrumental-music component (referred to as a music component below) and a lyrical or speech component. However, the speech component is distorted or reproduced unclearly in the music mode. Conversely, if the hearing aids are switched into the speech mode during this hearing situation, the speech component becomes clearer, but to the detriment of the music quality. It can also be observed that the hard of hearing find it very difficult to optimize the hearing situation "music", which of course also contains songs, on their own accord. Although a dedicated music program is helpful, it is usually unsatisfactory for a musician, singer or music lover.

Another widespread problem consists of a hearing situation in which conversation takes place over background music. In principle, the priority of the hard of hearing then is to hear the speech, but, like their peers, they also want to enjoy the background music at the same time. This cannot be implemented practically with current music and speech programs because either the music is prioritized, or the speech.

U.S. patent publication No. 2006/0177072 A1 discloses a learning system. It describes that the sound should be passed on to the "correct" ear, for example with the aid of headphones. More particularly, the speech content of presented sound should be passed to the right ear, and contents other than speech—such as music—should be passed to the left ear. As a result, this allows better utilization of the various functions of the left and the right half of the brain and this can increase the learning ability.

Moreover, the article "Left and Right Ears Not Created Equal as Newborns Process Sound" (UCLA/University of Arizona Scientists Discover), dated Sep. 9, 2004, by Elaine Schmidt in UCLA Newsroom describes how types of sound are processed differently from birth. Thus, the hearing sends the different types of sound to the respectively optimal side of the brain for processing. The sound-processing programs of hearing aids could be individualized accordingly.

SUMMARY OF THE INVENTION

It is accordingly an object of the invention to provide a dual setting method for a hearing system which overcome the above-mentioned disadvantages of the prior art methods and devices of this general type, which allows a hearing-aid wearer to hear or understand music with a speech component in an improved fashion.

According to the invention, the object is achieved by a method for controlling a binaural hearing system with a left hearing-device for a left ear and a right hearing-device for a right ear. The method includes determining a hearing situation with a music component and a speech component, switching one of the two hearing devices into a music mode and at the same time switching the other one of the two hearing devices into a speech mode.

Moreover, according to the invention, provision is made for a hearing system for binaural provision with a control apparatus that is configured to carry out the aforementioned method.

Hence, this advantageously allows dual control of a hearing system with two hearing devices or hearing aids in a hearing situation in which instrumental music and speech are present at the same time. This means that both the music component and the speech component are processed for the brain in an optimum fashion. The brain itself can then make a decision as to which component it predominantly concentrates on.

In the music mode, there is preferably greater amplification of the music component than the speech component. This produces an artificial separation of both components, and the music component is accentuated in the music mode.

Similarly, in the speech mode, there can be greater amplification of the speech component than the music component. This allows one of the two ears to be preferably provided with the speech component. Here, the music component can be either faded out completely or merely reduced. The same weighting can also be used in the music mode.

In a preferred embodiment, when the hearing devices are worn, the left hearing-device is switched into the music mode if sound with a music component and a speech component arrives at the wearer of the hearing devices from the left-hand side. It then goes without saying that conversely, if the sound arrives at the wearer from the right-hand side, the right hearing-device is also switched into the music mode. Thus, overall, the music component is weighted more strongly here than the speech component. However, in an alternative hearing-program design, the speech component may also be more pronounced than the music component.

In a hearing situation "speech with background music", the hearing device that is closer to the speech source when the hearing devices are worn can be switched into the speech mode. The other hearing device then preferably is in the music mode, and so the brain can once again decide what hearing side it wants to consider as more important and thus whether it would rather hear music or rather hear speech.

Furthermore, it can be advantageous for the hearing device in which the incident sound has a greater volume to be switched into the music mode. As an alternative to the volume, it is also possible to use a different physical variable, e.g. the sound pressure level, for the switching decision.

Furthermore, it is expedient if the switching between music mode and speech mode is controlled based on a hysteresis. This can prevent continuous switching between speech mode and music mode in an almost symmetric hearing situation.

Moreover, the two hearing devices can be automatically switched into the respective mode and the resulting switching result can be modified manually by the hearing-device wearer, despite this automation. Hence, manual switching of the hearing devices is prioritized over automatic switching, and the automatic mode of the hearing devices need not be switched off in the process.

Other features which are considered as characteristic for the invention are set forth in the appended claims.

Although the invention is illustrated and described herein as embodied in a dual setting method for a hearing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

The exemplary embodiments explained in more detail below constitute preferred embodiments of the present invention.

As mentioned at the outset, the current configuration of hearing aids is unsatisfactory because, although various hearing-aid programs, which can be selected by pushing a button on the hearing aid or by remote control, are available to hearing-aid wearers, there often is only a single program available for music in particular, even though the general hearing situation "music" can be subdivided at least into "instrumental music without speech component" and "instrumental music with speech component". Moreover, in known hearing aids, the general program "music" is set equally on both sides (left ear and right ear) in the respective hearing situation.

In order to solve this problem, a hearing system, which contains two hearing aids in the present exemplary embodiment, is provided according to the invention, with one of these hearing aids being switched into the music mode and the other being switched into the speech mode by an internal control apparatus. This means that the one hearing aid is set for optimally reproducing instrumental music, while the other hearing aid is set for optimally reproducing speech. In the process, the hearing aid that is switched into the music mode may be dominant. Thus, the hearing-aid wearer can predominantly enjoy the music. However, if the hearing-aid wearer would like to follow the lyrics of the song more closely, he/she can pay more attention to the less dominant hearing aid, which is switched into the speech mode. Here, the present invention is based on the idea that the brain is used to focus on what the hearing-aid wearer wants to hear, without needing to adjust the hearing aid. Thus, the hearing system is switched into a dual mode; to be precise, the one hearing aid is switched into a music mode and the other one is switched into a speech mode.

In particular, the hearing aid in the music mode can be operated with more gain and the hearing aid in the speech mode can be operated with less gain. In a manner similar to the natural situation of listening, the hearing-aid wearer can concentrate on the speech-optimized hearing aid (hearing aid in the speech mode) if he/she wishes to understand the lyrics of the song or the piece of music.

Figure 1:
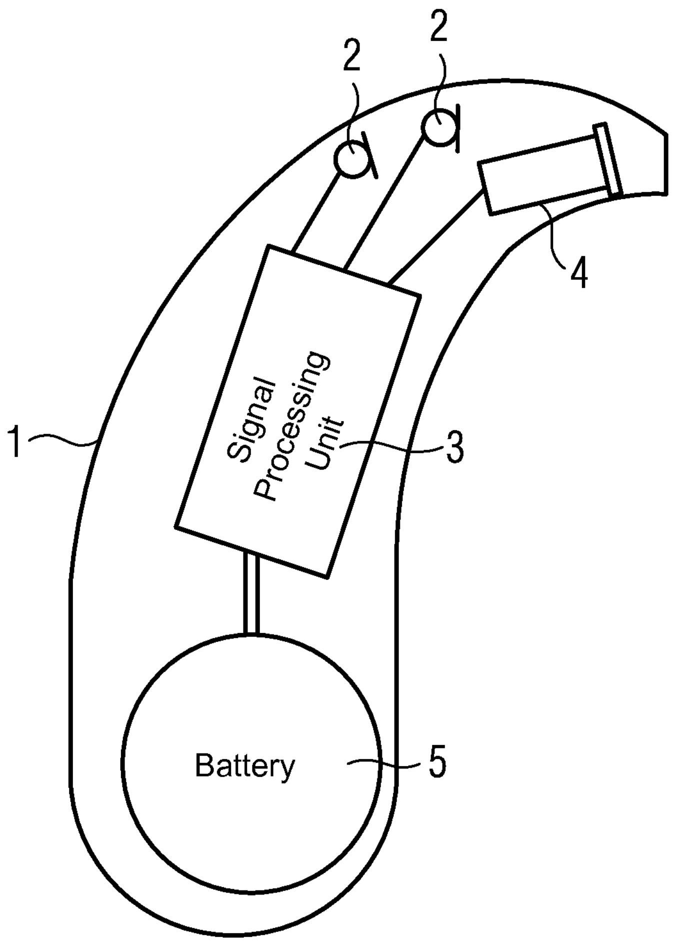
FIG. 1 PRIOR ART
FIG. 1 is a diagrammatic, illustration of a hearing aid according to the prior art.
Figure 2:
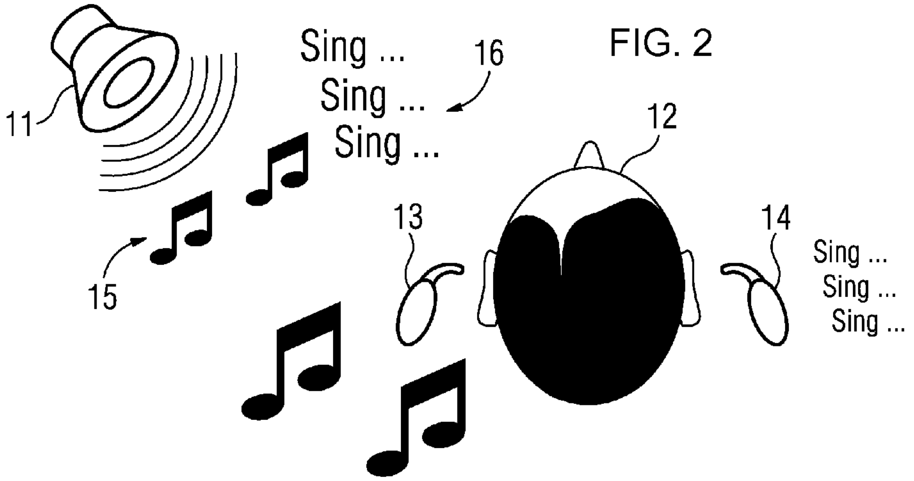
FIG. 2 is a diagrammatic, illustration of a switching example of a hearing-aid system in the case of singing, accompanied by music, from the left-hand side according to the invention.

FIG. 2 schematically illustrates a musical hearing situation, in which a music source 11 is located on the left-hand side of a hearing-aid wearer 12. The hearing-aid wearer 12 is illustrated in a plan view and respectively wears one hearing aid in/on both ears. The hearing aid worn on the left is denoted the left hearing-aid 13 (left hearing-device) and the hearing aid worn on the right ear is denoted the right hearing-aid 14 (right hearing-device).

Here, music with an instrumental-music component 15 and a lyrical text-component 16 emanates from the music source 11. Thus, the lyrical text-component 16 is a speech component, and the instrumental component 15 is referred to as a music component in this case.

Since the sound arrives at the hearing-aid wearer 12 from the left-hand side in this case, the left hearing-aid 13 is switched into the music mode in the present example, while the right hearing-aid 14 is switched into the speech mode. Thus, the hearing aid facing the music source 11 is switched into the music mode and the other hearing aid is switched into the speech mode.

In order to accentuate the music further, the left hearing-aid 13 is in this case set slightly louder than the right hearing-aid 14. In FIG. 2, this is symbolized by the music notes at the left hearing-aid 13 being illustrated bigger than the music notes of the music component 15 at the music source 11. By contrast, the gain of the right hearing-aid 14 is set slightly lower, and so the hearing-aid wearer 12 perceives the speech component as being slightly quieter. Thus, the music component should be slightly accentuated in this case and is weighted more strongly by the hearing-aid system than the speech component. In another embodiment, in which other hearing programs are used, this could be reversed.

If the hearing-aid wearer 12 would now like to understand the lyrics of the piece of music more clearly, he/she will concentrate more on the right ear, as if he/she were listening to the right direction. Otherwise, if he/she would rather listen to the music, he/she concentrates more on the left ear.

Figure 3:
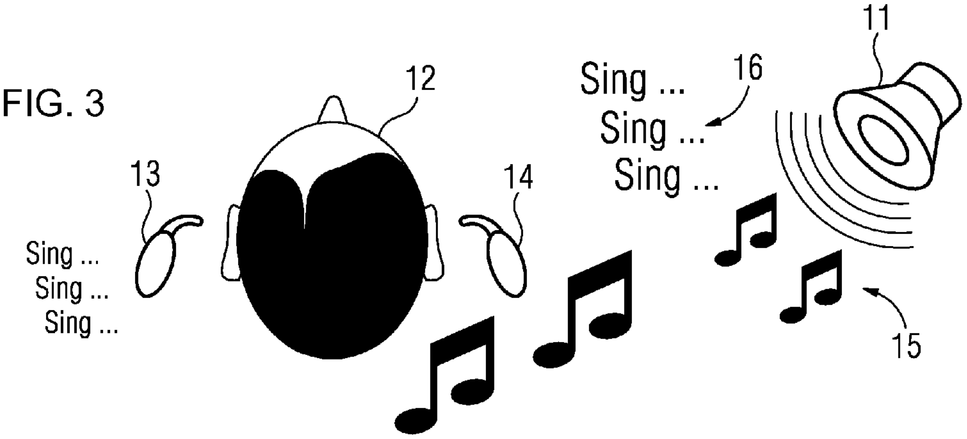
FIG. 3 is a diagrammatic, illustration of a switching example of a hearing-aid system in the case of singing, accompanied by music, from the right-hand side according to the invention.

FIG. 3 reproduces, in an analogous representation, the situation where music, accompanied by speech, arrives at the hearing-aid wearer 12 from the right-hand side. Thus, like in FIG. 2, the music also contains an instrumental-music component 15 and a speech component 16. However, since the music source 11 is located on the right-hand side of the hearing-aid wearer 12, the two hearing aids 13 and 14 interchange their settings, i.e. the left hearing-aid 13 switches into the speech mode and the right hearing-aid 14 switches into the music mode. The dual function in this case also ensures a slightly lower gain of the speech components than the music gain on the right hearing-aid 14. Thus, the right hearing-aid 14 in the music mode is the dominant hearing-aid in this case.

As an alternative thereto, the hearing aid facing away from the music source 11 can also be switched into the music mode and the hearing aid facing the music source 11 can also be switched into the speech mode. Here, as in the previous exemplary embodiments as well, the "switching" does not only mean actual switching between modes, but, possibly, also maintaining the switching state if, for example, a hearing aid is in the music mode and continues to be operated in the music mode. The hearing aid is then switched into the music mode.

The switching of the hearing aids from the situation as per FIG. 2 into the situation in FIG. 3, or vice versa, can be brought about manually or automatically. The hearing system then selects that side on which the sound arrives at a higher volume as the dominant side, and the hearing aid is for example switched into the music mode on the dominant side. If sound should arrive at approximately equal volumes on both sides, the hearing aid may optionally continue to be operated in an unchanged fashion or switching may take place, e.g. based on a hysteresis. Moreover, a development of the system may provide the option for the hearing-aid wearer to select the program manually, even if the hearing system is in the automatic mode. The manual selection then takes precedence.

Figure 4:
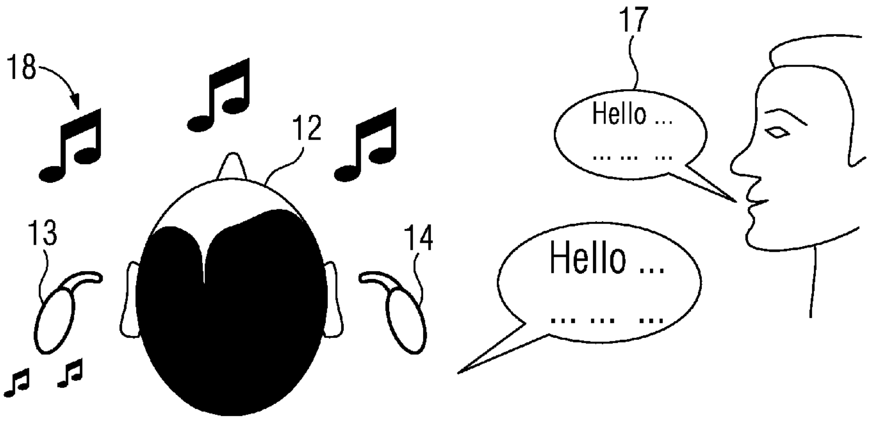
FIG. 4 is a diagrammatic, illustration of a switching example in a hearing situation "speech over background music" according to the invention.

FIG. 4 illustrates another hearing situation, in which a conversation 17 is taking place over background music 18. Here, a setting should be utilized in which that hearing aid that is switched into the speech mode is dominant. It is for this reason that, in the example in FIG. 4, the right hearing-aid 14, in which the speech signal or the speech component 17 is louder, is switched into the speech mode in order to optimize the speech recognition. By contrast, the left hearing-aid 13 is switched into the music mode. Moreover, the speech component may in this case also be amplified more strongly than the music component. The gain in the right hearing-aid 14 should then be set correspondingly higher than in the left hearing-aid 13. Using this setting of the hearing system, the hearing-aid wearer will be able to understand the conversation 17 more clearly, and will at the same time be able to listen to the background music. If he/she would rather listen to the music, he/she will concentrate on that ear in which there is the better music reproduction.

The invention claimed is:

1. A method for controlling a binaural hearing system with a left hearing-device for a left ear and a right hearing-device for a right ear, which comprises the steps of:
- determining a hearing situation with a music component and a speech component via the left and right hearing devices of the binaural hearing system;
- switching one of the left and right hearing devices into a music mode via the left and right hearing devices of the binaural hearing system;
- at a same time, switching the other one of the left and right hearing devices into a speech mode via the left and right hearing devices of the binaural hearing system; and
- wherein, in a hearing situation with speech with background music, switching the left or right hearing device that is closer to a speech source into the speech mode when the left and right hearing devices are worn.

2. The method according to claim 1, wherein, in the music mode, there is greater amplification of the music component than the speech component.

3. The method according to claim 1, wherein, in the speech mode, there is greater amplification of the speech component than the music component.

4. A method for controlling a binaural hearing system with a left hearing-device for a left ear and a right hearing-device for a right ear, which comprises the steps of:
- determining a hearing situation with a music component and a speech component via the left and right hearing devices of the binaural hearing system;
- switching one of the left and right hearing devices into a music mode via the left and right hearing devices of the binaural hearing system;
- at a same time, switching the other one of the left and right hearing devices into a speech mode via the left and right hearing devices of the binaural hearing system; and
- when the left and right hearing devices are worn, switching the left hearing-device into the music mode if sound with the music component and the speech component arrives at a wearer of the left and right hearing devices from a left-hand side.

5. A method for controlling a binaural hearing system with a left hearing-device for a left ear and a right hearing-device for a right ear, which comprises the steps of:

determining a hearing situation with a music component and a speech component via the left and right hearing devices of the binaural hearing system;

switching one of the left and right hearing devices into a music mode via the left and right hearing devices of the binaural hearing system;

at a same time, switching the other one of the left and right hearing devices into a speech mode via the left and right hearing devices of the binaural hearing system; and wherein the left or right hearing device in which an incident sound has a greater volume is switched into the music mode.

6. A method for controlling a binaural hearing system with a left hearing-device for a left ear and a right hearing-device for a right ear, which comprises the steps of:

determining a hearing situation with a music component and a speech component via the left and right hearing devices of the binaural hearing system;

switching one of the left and right hearing devices into a music mode via the left and right hearing devices of the binaural hearing system;

at a same time, switching the other one of the left and right hearing devices into a speech mode via the left and right hearing devices of the binaural hearing system; and controlling switching between the music mode and the speech mode based on hysteresis.

* * * * *